United States Patent [19]

Le Mehaute et al.

[11] 4,076,900
[45] Feb. 28, 1978

[54] SODIUM-SULPHUR TYPE ELECTRIC CELL

[75] Inventors: Alain Le Méhauté, Gif sur Yvette; Philippe Bordet, Sartrouville, both of France

[73] Assignee: Compagnie Generale d'Electricite S.A., Paris Cedex, France

[21] Appl. No.: 738,983

[22] Filed: Nov. 4, 1976

[30] Foreign Application Priority Data

Nov. 20, 1975 France .............................. 75 35470

[51] Int. Cl.² .......................................... H01M 12/00
[52] U.S. Cl. ........................................ 429/49; 429/104
[58] Field of Search .................. 429/103, 104, 105, 49

[56] References Cited

U.S. PATENT DOCUMENTS

| | | | |
|---|---|---|---|
| 3,672,994 | 6/1972 | Mitoff | 429/104 |
| 3,980,496 | 9/1976 | Ludwig et al. | 429/103 |
| 3,985,575 | 10/1976 | Ludwig | 429/103 |

*Primary Examiner*—Donald L. Walton
*Attorney, Agent, or Firm*—Sughrue, Rothwell, Mion, Zinn and Macpeak

[57] ABSTRACT

The invention relates to an electric cell of the sodium-sulphur type particularly adapted for undergoing complete recharging. It comprises a cathode tank containing sulphur, an anode tank containing sodium, these reagents being separated by a solid electrolyte tube disposed in said cathode tank fitted with graphite felt washers ensuring cathode collection of the current generated, wherein said electrolyte tube is surrounded by a grating which is connectable to the negative terminal of the recharging current source by means of a resistor. The invention is used in cells for electric vehicles.

3 Claims, 2 Drawing Figures

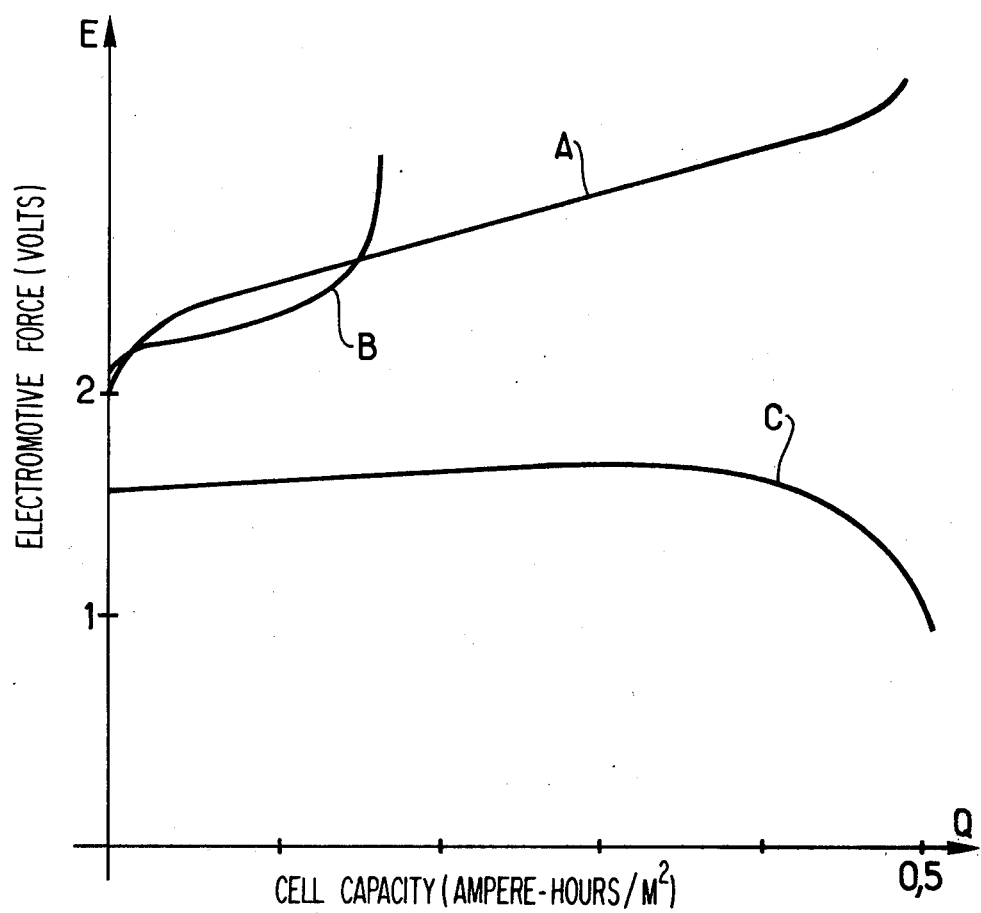

SODIUM-SULPHUR TYPE ELECTRIC CELL

FIELD OF THE INVENTION

The present invention relates to electric cells of the sodium-sulphur type.

BACKGROUND OF THE INVENTION

It is known that in these cells the anode reagent is constituted by an alkaline metal, generally sodium, which must be liquid at operation temperature. The cathode reagent is generally constituted by sulphur and the sodium salts of this substance, but can also be constituted by phosphorus, selenium and the alkaline salts of these substances. In the case where the reagent materials are sulphur and sodium, the electrochemical reaction leads to the reversible formation of sodium polysulphides whose sodium content increases during discharge. As for the electrolyte, which separates the cathode and anode reagents, it must be solid at operation temperature, i.e. about 300° C, permeable to the alkaline ions which form in the anode compartment and impermeable to electrons. It is generally constituted by beta sodium alumina, i.e. a compound having about 5 to 9 alumina molecules for one sodium oxide molecule. It is generally in the shape of a tube closed at its bottom, containing the anode reagent and immersed in the cathode reagent, the latter reagent being contained in a metal cathode tank and impregnating a graphite felt. The electrolyte tube is held by a support connected in a fluid-tight manner to this cathode tank and also to an anode reagent tank.

Generally, said support is in the form of a plate or disk made of alpha alumina. This disk has a central bore in which the beta sodium alumina is fixed.

In such cells, the discharge process leads to the transformation of sulphur into sodium polysulphuides in the sequence set forth hereinbelow:

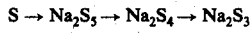

$$S \rightarrow Na_2S_5 \rightarrow Na_2S_4 \rightarrow Na_2S_3$$

During recharging, the reverse process occurs. However, it is observed that it is practically impossible in conventional cells to effect the transformation:

$$Na_2S_5 \rightarrow S$$

and consequently to effect complete recharging.

This disadvantage appears to result from the fact that during recharging a film of sulphur is permanently deposited on the electrolyte tube which fulfills the function of a migration barrier with respect to the sodium ions and thus opposes the total regeneration of elementary sulphur.

On the basis of this experimental observation the applicant has produced a new structure for a sodium-sulphur cell suitable for remedying such a disadvantage and consequently for enabling a practically complete recharging of said cell.

SUMMARY OF THE INVENTION

The present invention provides an electric cell of the sodium-sulphur type, wherein a cathode tank containing a cathode reagent which is liquid at operation temperature and selected from the group formed by sulphur, phosphorus, selenium and the alkaline salts of these substances.

At least one solid electrolyte tube is closed at its bottom end, contains an anode reagent which is liquid at operation temperature, constituted by an alkaline metal and is disposed in said cathode tank so as to be immersed in said cathode reagent with the walls of the tube being made of beta alkaline alumina.

An insulating ceramic support holds said electrolyte tube in said cathode tank with a glass part forming the connection between the support and the tube.

An anode tank contains a supply of said anode reagent and is disposed above said cathode tank so that said electrolyte tube opens at its top into in this anode tank. The plate separates the open ends of said anode tank and of said cathode tank. The cathode tank is fitted with washers made of graphite felt ensuring cathode collection of the generated current. The improvement resides in the electrolyte tube being surrounded by a sleeve or grid which is electronically conductive and adapted to be connected to the negative terminal of the recharging current source through a resistor during recharging of said cell.

The resistor has a value such that the intensity of the current which passes through it lies between a third and a twentieth of the recharging current of the cell.

An embodiment of the invention is described by way of a purely illustrative example having no limiting character with reference to the accompanying drawings.

BRIEF DESCRIPTION OF THE DRAWINGS

FIG. 2 is a graph showing the performance of an electric cell according to the invention.

The electric cell is in the form of a cylinder of revolution, and FIG. 1 is a cross-section view thereof in an axial plane, but of course it could have quite a different shape.

Figure 1:
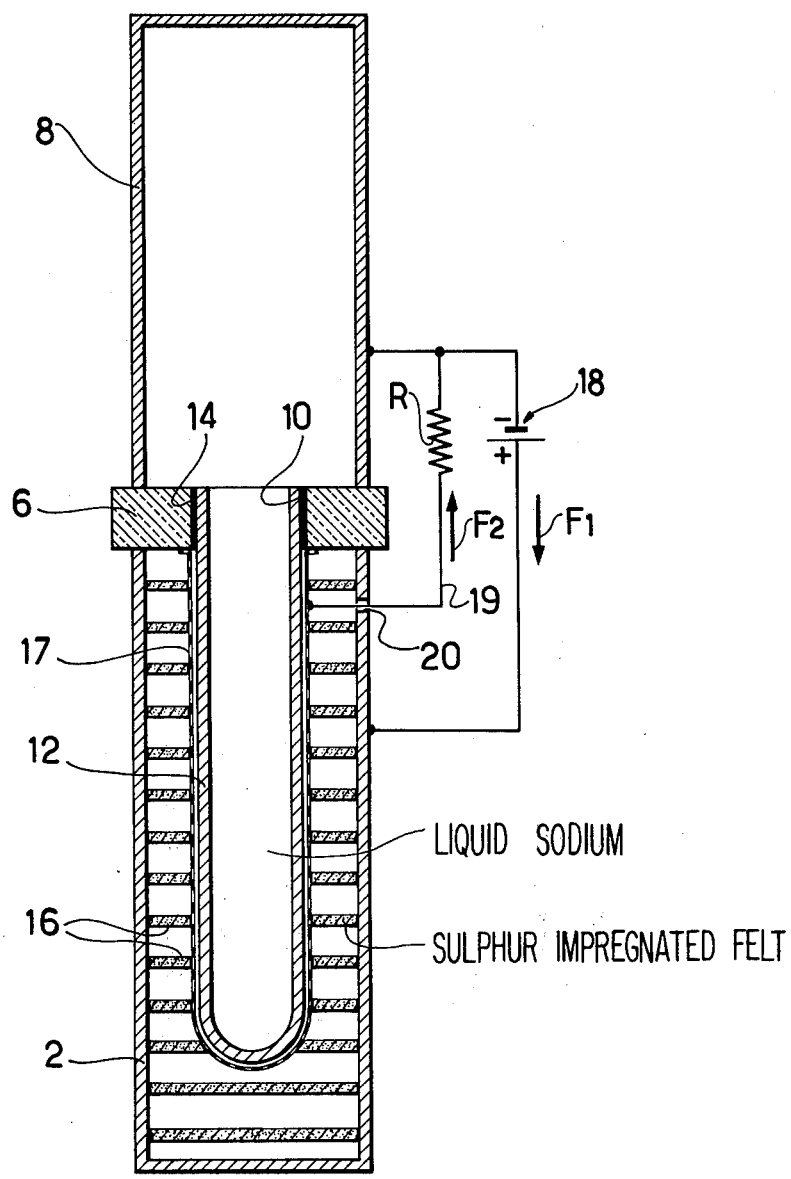
FIG. 1 is a cross-section of an electric cell embodying the invention.

The electric cell shown has a conductive cylindrical cathode tank 2, fitted with graphite felt washers 16, impregnated with sulphur and fulfilling the function of a current collector. The washers 16 have a hole in their centres to receive an electrode tube 12. The wall of the tank 2 is fixed at its top part to the bottom face of an alpha alumina plate 6 which is horizontal and circular.

A cylindrical anode tank 8 which is also conductive and has substantially the same diameter as the cathode tank 2, is fixed in the same way by its bottom part to the top surface of the plate 6.

It contains a supply of anode reagent constituted by liquid sodium.

In the centre of the plate 6 there is a cylindrical bore 10 with a vertical axis. The open top end of the electrolyte tube 12 is engaged in the bore 10. The electrolyte tube 12 is closed at its bottom end, made of beta sodium alumina and contains the anode reagent.

The top edge of the tube 12 is in the plane of the top surface of the plate 6.

A glass connection part 14 is inserted between the outside wall of the top of the tube 12 and the wall of the bore 10 formed in the plate 6 so as to seal the connection.

The electrolyte tube 12 is surrounded by a sleeve or grid 17 made of a conductive material which withstands the aggressivity of sulphur and of polysulphides, e.g. of nickel, chromium, molybdenum, stainless steel or graphite fabric. A direct current sorce 18 is provided for the recharging of the cell. The negative terminal of this source is therefore connected to the tank 8, and a positive terminal is connected to the tank 2.

Further, said grid 17 is connected by a resistor R to the negative terminal of the current source, by means of a wire 19 passing through the wall of the tank 2 via a sealed insulating passage 20. The arrows F1 and F2 show the direction of the charging current and of the current circulating in the resistor R, respectively. The value of the resistance R being such that the intensity of the current through it lies between a third and a twentieth of the charging current, preferably a fifth.

It will therefore be seen that the grid 17 makes it possible to modify the local potential of the felt 16 as at the electrolyte tube 12; the result of this is that the sulphur film which tends to form permanently during recharging is transformed into a polysulphide and hence cannot act as a barrier opposing the transformation of Na2S5 into sulphur as previously explained. Consequently, the cell can undergo complete recharging.

The graph in FIG. 2 shows the electromotive force E in volts of such a cell as a function of the capacity Q at the electrolyte, expressed in ampere-hours/squ. cm.

In particular, the curve A is the charge curve for a zero grid current.

The curve B is the charge curve for a grid current of 15 mA/qu. cm.

In both cases, the density of the charge current is 50 mA/sq. cm.

The curve C relates to the discharge of such a cell for a current density of 200 mA/squ. cm.

The electrical efficiency is about 75%.

It must be understood that the invention is in no way limited to the embodiment described and illustrated which has been given only by way of an example. In particular, without going beyond the scope of the invention, details can be modified, dispositions can be changed or means can be replaced by equivalent means.

We claim:

1. In combination an electric cell of the sodium-sulphur type, and a charging circuit, said electric cell comprising:

a cathode tank containing a cathode reagent which is liquid at operation temperature and is a material selected from the group consisting of sulphur, phosphorus, selenium and the alkaline salts of these substances, at least one solid electrolyte tube closed at its bottom end, containing an anode reagent which is liquid at operation temperature, constituted by an alkaline metal, said tube being disposed in said cathode tank so as to be immersed in said cathode reagent with the walls of the tube being made of beta alkaline alumina;

an insulating ceramic support for holding said electrolyte tube in said cathode tank, a glass part forming the connection between the support and the tube;

an anode tank containing a supply of said anode reagent and being disposed above said cathode tank so that said electrolyte tube opens at its top into said anode tank, said insulating support comprising a plate separating the open ends of said anode tank and of said cathode tank, said cathode tank being fitted with washers made of graphite felt ensuring cathode collection of the generated current, and said charging circuit for said cell including a charging current source having positive and negative terminals and means for connecting said negative terminal to said anode tank and said positive terminal to said cathode tank for cell recharging, the improvement wherein:

said electrolyte tube is surrounded by a sleeve or grid which is electronically conductive, said grid being positioned between said electrolyte tube and said graphite felt washers and being connected to the negative terminal of the recharging current source through a resistor.

2. The combination according to claim 1, wherein said resistor has a value such that the intensity of the current which passes through it lies between a third and a twentieth of the recharging current of the cell.

3. The combination according to claim 1, wherein the grid is made of a material chosen fro the group consisting of nickel, chrome, molybdenum, stainless steel and graphite.

* * * * *